No. 831,644. PATENTED SEPT. 25, 1906.
F. J. COLE.
SUPERHEATER.
APPLICATION FILED APR. 30, 1906.

6 SHEETS—SHEET 1.

No. 831,644. PATENTED SEPT. 25, 1906.
F. J. COLE.
SUPERHEATER.
APPLICATION FILED APR. 30, 1906.

6 SHEETS—SHEET 3.

No. 831,644.  
PATENTED SEPT. 25, 1906.

F. J. COLE.  
SUPERHEATER.  
APPLICATION FILED APR. 30, 1906.

6 SHEETS—SHEET 4.

WITNESSES  
James C. Herron.  
S. R. Bell.

INVENTOR  
Francis J. Cole.  
by J. Snowden Bell,  
Att'y.

No. 831,644. PATENTED SEPT. 25, 1906.
F. J. COLE.
SUPERHEATER.
APPLICATION FILED APR. 30, 1906.
6 SHEETS—SHEET 6.
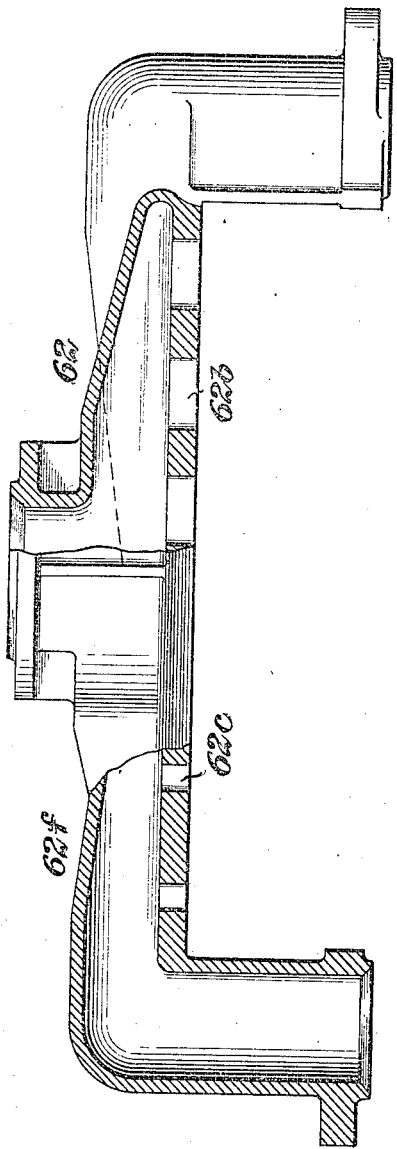
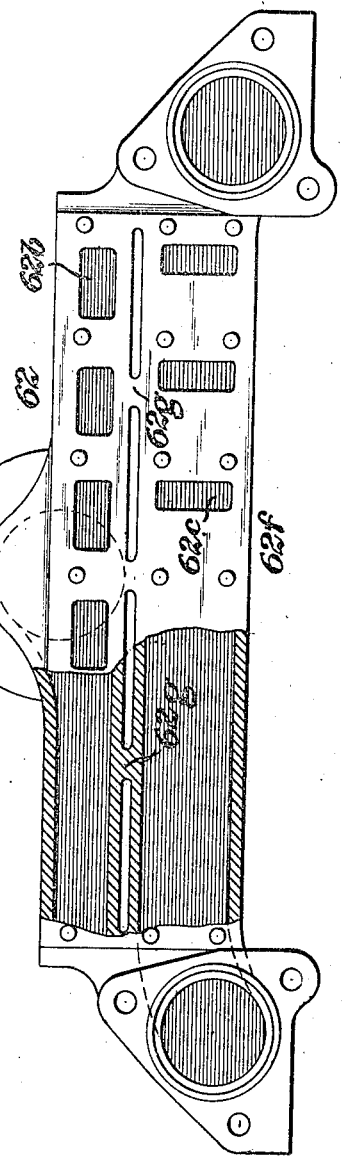
WITNESSES
James C. Herron.
S. R. Bell.
INVENTOR
Francis J. Cole,
by Snowden Bell,
Att'y.

UNITED STATES PATENT OFFICE.

FRANCIS J. COLE, OF NEW YORK, N. Y., ASSIGNOR TO AMERICAN LOCOMOTIVE COMPANY, OF NEW YORK, N. Y., A CORPORATION OF NEW YORK.

SUPERHEATER.

No. 831,644.　　　Specification of Letters Patent.　　　Patented Sept. 25, 1906.

Application filed April 30, 1906. Serial No. 314,349.

*To all whom it may concern:*

Be it known that I, FRANCIS J. COLE, of the borough of Manhattan, in the city and State of New York, have invented a certain new and useful Improvement in Steam-Boiler Superheaters, of which improvement the following is a specification.

My present invention relates to superheaters of the general class or type exemplified in Letters Patent of the United States No. 782,490, granted and issued to the American Locomotive Company as assignee of myself and Carl J. Mellin under date of February 14, 1905; and its object is to provide in a superheating appliance means whereby the steam after having been superheated shall be effectually protected from the cooling action of the saturated steam in the passage of the latter from the boiler to and through the superheating appliances.

The improvement claimed is hereinafter fully set forth.

Figure 1:
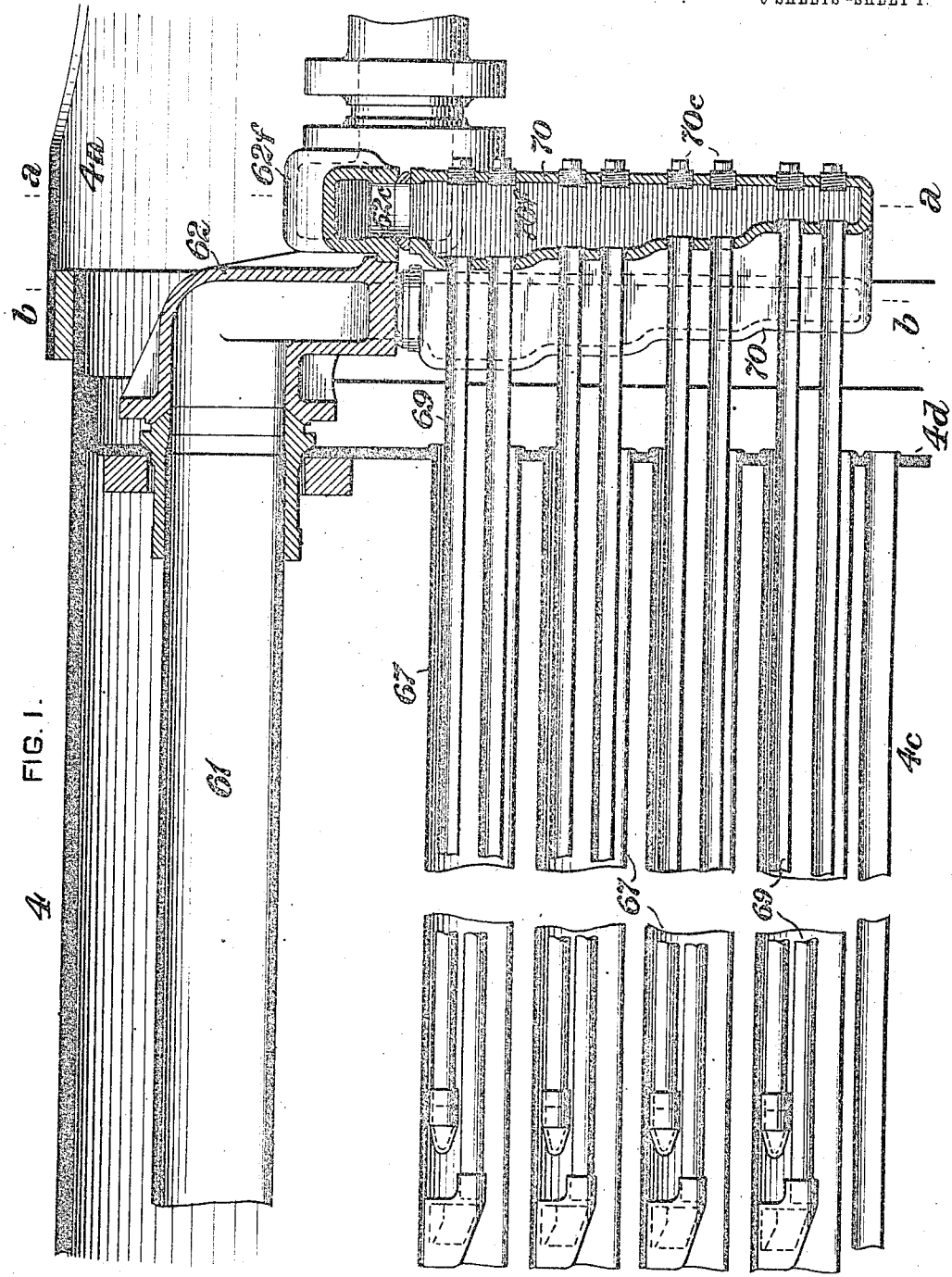
Figure 2:
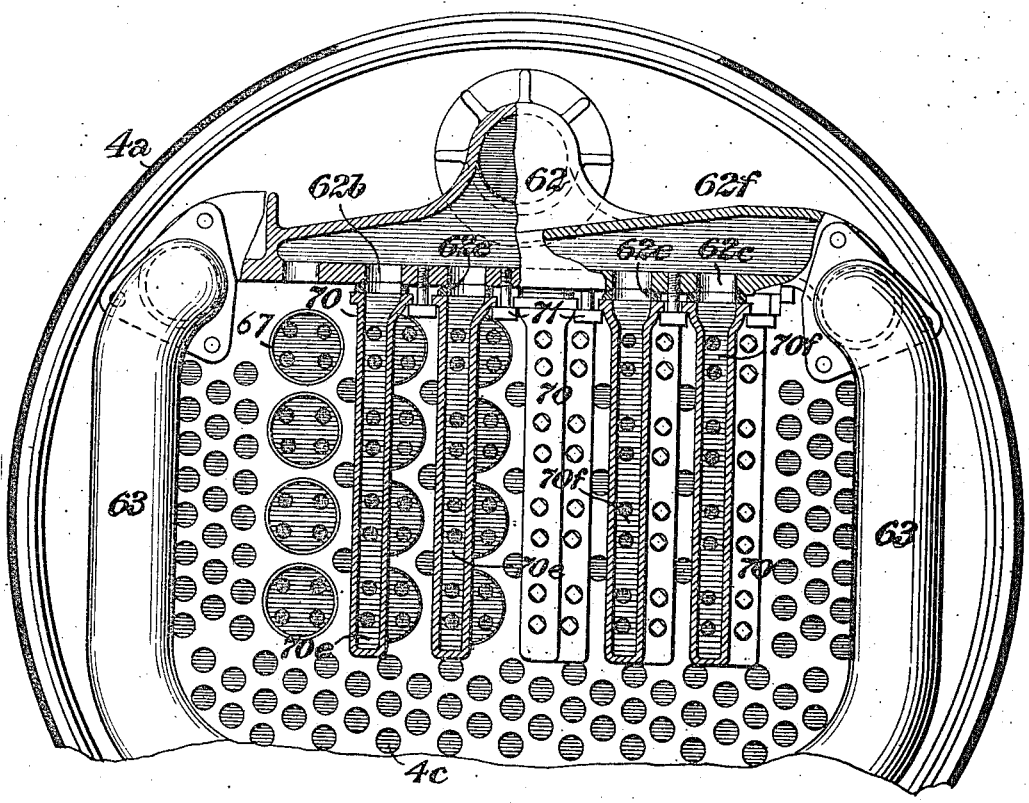
Figure 3:
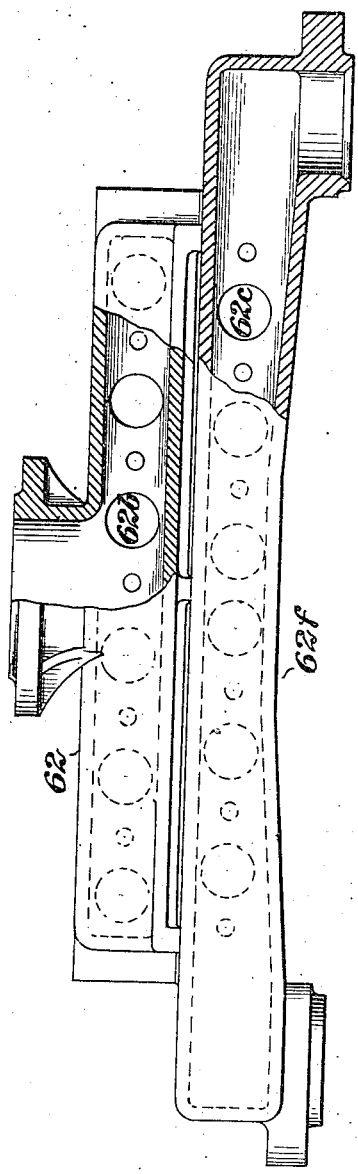
Figure 4:
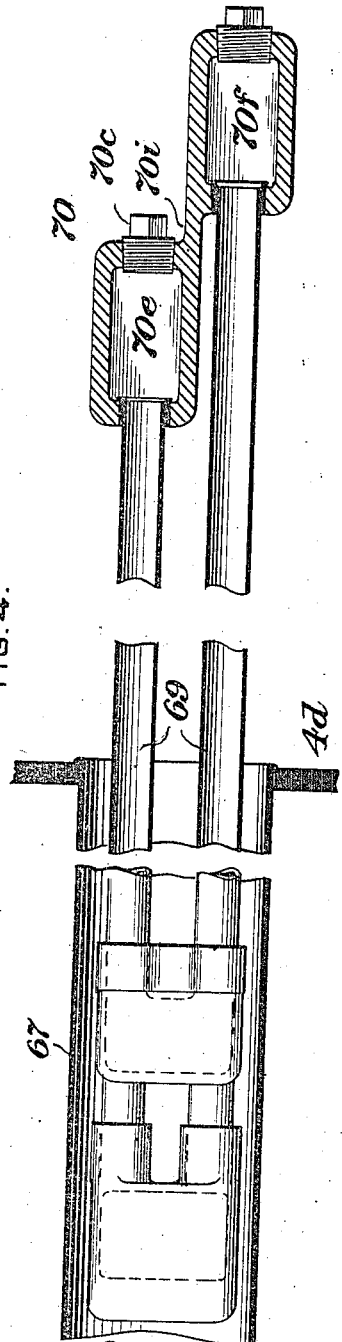
Figure 5:
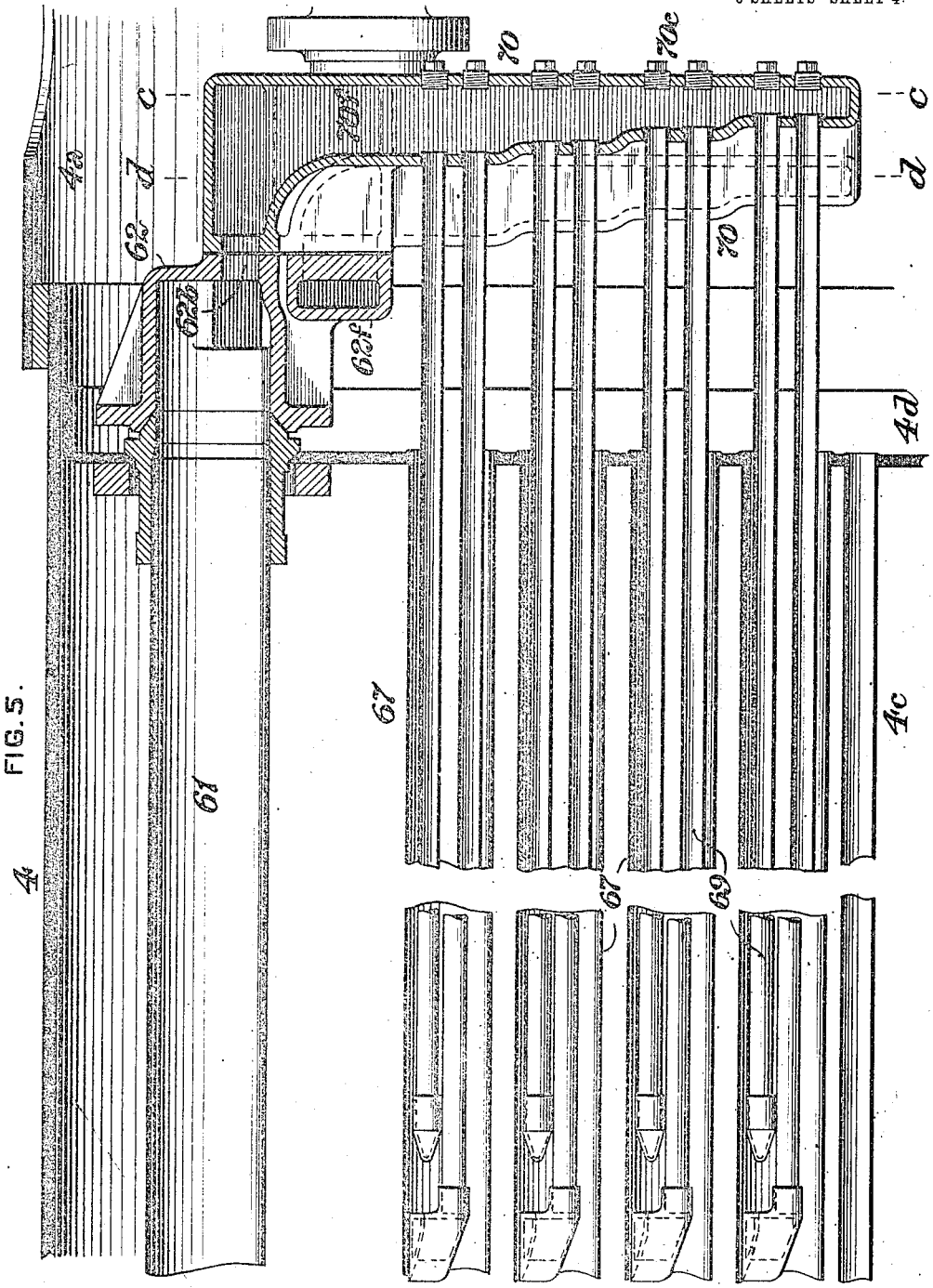
Figure 6:
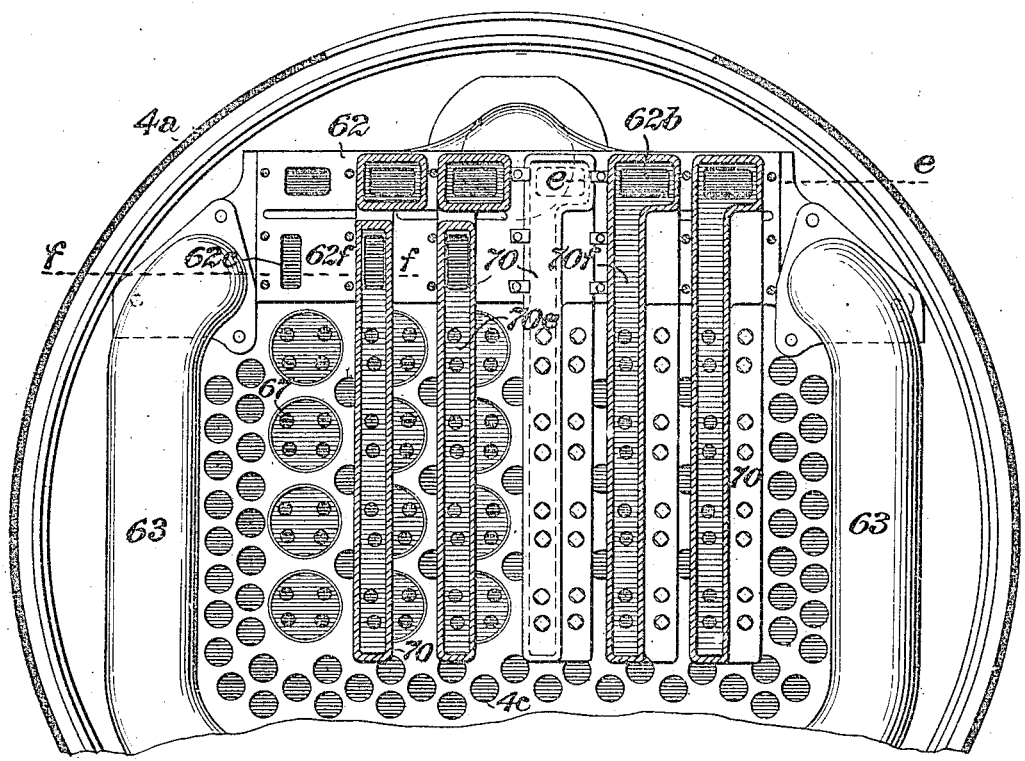

In the accompanying drawings, Figure 1 is a vertical longitudinal section through the forward portion of a locomotive-boiler, illustrating an application of my invention; Fig. 2, a vertical transverse section through the smoke-box, the right-hand half being taken on the line $a\,a$ of Fig. 1 and the left-hand half on the line $b\,b$ of the same figure; Fig. 3, a plan view, partly in section, of the T-heads; Fig. 4, a horizontal section, on an enlarged scale, through one of the headers and a portion of a superheating fire-tube and through the superheater-pipes located in said tube; Fig. 5, a vertical longitudinal section through the forward portion of a locomotive-boiler, illustrating a structural modification of my invention; Fig. 6, a vertical transverse section through the smoke-box, the T-head being shown partly in elevation and partly in section on the lines $c\,c$ and $d\,d$, respectively, of Fig. 5; Fig. 7, a view of the T-head, partly in plan and partly in section, on the lines $e\,e$ and $f\,f$, respectively, of Fig. 6; and Fig. 8, a front view, partly in section, of the T-head.

My invention is herein, as in Letters Patent No. 782,490 aforesaid, set forth as applied in connection with a locomotive-boiler 4, which is of the ordinary construction and is provided at its forward end with a smoke-box $4^a$. A plurality of fire-tubes $4^c$, ordinarily of comparatively small diameter, extend from the fire-box at the rear end of the boiler, which is not shown, to the front flue-sheet $4^d$, and the products of combustion pass through said tubes and through a number of tubes 67 of larger diameter, which are located in the upper and middle portion of the space within the boiler and which will be herein descriptively termed "superheating-tubes," to the smoke-box $4^a$, from which they are discharged into the atmosphere through a stack in the ordinary manner. Steam is supplied from the boiler to the cylinders through a main steam-pipe or dry pipe 61, passing through the front flue-sheet $4^d$ and connected in front thereof to a transverse T-head 62, from which it is conducted through superheater-pipes 69, which, with their connections, will be presently described, and after being superheated in said pipes passes to the cylinders through branch steam-pipes 63, located on opposite sides of the smoke-box.

Referring first to Figs. 1 to 4, inclusive, in the practice of my invention I locate in each of the superheating-tubes 67 one or more pairs (preferably, as shown, two pairs) of superheater-pipes 69, said pipes extending longitudinally in the superheating-tubes from a vertical plane a short distance—say thirty inches or thereabout—forward of the fire-box flue-sheet to vertical planes in the smoke-box forward of the front flue-sheet. The superheater-pipes of each pair are connected at their rear ends by return-bends or other suitable fittings and are held up in normal position in the superheating-tubes by any suitable and preferred supports. The superheater-pipes are open at their forward ends, at which they are connected, as hereinafter described, with the main-supply steam-pipe 61 and the branch or delivery steam-pipes 63, so as to constitute continuous avenues or channels throughout the length of which the steam which is to be superheated traverses from the supply steam-pipe to the branch or delivery steam-pipes. To this end the several pairs of superheater-pipes 69, which are located in each vertical row of superheating-tubes 67, are connected at their forward ends to a vertical casing or header 70, which is located a short distance forward of the front flue-sheet $4^d$ and is in the form of two independent chambers or compartments, one of which, $70^e$, is provided for the reception of saturated steam and the other, $70^f$, for the delivery of superheated steam. Said header-compartments are set one in advance of the other on opposite sides of a vertical plane coincident with the central plane of the vertical row of superheater-tubes for the pipes of which the header is applied and are preferably, as shown, formed integral and connected at their adjoining ends by a narrow web $70^i$. They may, however, if desired, be made of separate castings, having projections on their adjoining ends, which are planed and faced off on a machine and abut, so as to insure their registration and the proper relative location of the front and rear compartment castings.

By reference to Fig. 4 it will be seen that except as to the comparatively slight area of the portions of the walls of the header-compartments $70^e$ $70^f$, between which the connecting-web $70^i$ or the equivalent abutting projections, as the case may be, is or are interposed, said compartments are entirely out of contact one with the other, and therefore no appreciable transfer of heat can be effected between them. It will also be seen that the four side walls and the bottom wall of each of the compartments are exposed throughout their entire extent to the heat of the smoke-box gases. The forward end of one of the superheater-pipes 69 of each pair is expanded into the rear wall of the rear compartment $70^e$ of the header of the vertical row of superheating-tubes in which the pair is located, and the forward end of the other pipe of each pair is similarly connected to the rear wall of the forward compartment $70^f$ of the header. The rear walls of the header-compartments are progressively stepped or staggered forwardly from top to bottom, so as to gradually decrease the transverse section of the compartments from their upper to their lower ends in order to provide proper facilities for the discharge of the products of combustion from the boiler-tubes. Openings, which are closed by removable plugs $70^c$, are formed in the front walls of the header-compartments, said openings providing for the insertion, examination, cleansing, and repairs of the superheater-pipes. In the event of leakage at the joints the plugs can be detached and the pipes expanded, as may be required.

Ports $62^b$ are formed in the bottom wall of the T-head 62, each of said ports communicating with a corresponding port in the top of the rear compartment $70^e$ of one of the headers 70. Ball-joints $62^e$ are preferably interposed between the T-head and the headers at the several ports in order to prevent leakage thereat while permitting a limited degree of relative movement. A supplementary or delivery compartment T-head $62^f$ extends across the smoke-box in front of the main or supply T-head 62, from which its walls are separated throughout, except as to narrow projections at its bottom, through which it abuts against the main T-head. Ports $62^c$ are formed in the bottom wall of the delivery-compartment T-head $62^f$, each of said ports communicating with a corresponding port in the top of the forward compartment $70^f$ of one of the headers 70, and ball-joints $62^e$ are preferably interposed at the several ports. The headers are secured detachably to the main and to the delivery compartment T-heads 62 $62^f$ by bolts 71, and thereby serve to attach the latter to the former and support it in proper relation thereto. The branch steam-pipes 63, leading to the cylinders, are connected to nozzles at the ends of the delivery-compartment T-head $62^f$.

In operation saturated steam from the boiler passes through the dry pipe 61 into the T-head 62 and thence into the rear or saturated-steam compartments $70^e$ of the several headers, from which it passes, first rearwardly and then forwardly, through the connected superheater-pipes 69 and thence into the forward or superheated-steam compartments $70^f$ of the headers, being in its traverse through the superheater-pipes thoroughly superheated by the hot products of combustion which pass through the inclosing superheating-tubes. The superheated steam passes from the compartments $70^f$ of the headers into the delivery-compartment T-head $62^f$ and thence through the branch steam-pipes 63 to the engine-cylinders for utilization therein.

By reason of the substantially complete separation of the walls of the main or receiving T-head from those of the delivery-compartment T-head and of the walls of the saturated-steam compartments of the headers from those of the superheated-steam compartments loss of heat which would result from its transfer through said walls from the superheated to the saturated steam is effectually prevented. The form and location of the headers are also such as to expose a large area of effective heating-surface to the action of the hot products of combustion passing through the smoke-box.

Figs. 5 to 8, inclusive, illustrate an application of my invention which accords in all essential particulars with that above described and differs therefrom only as to structural detail. In this, as in the former case, the headers 70 and the T-head each comprise saturated and superheated steam compartments or chambers, the walls of which are substantially separate one from the other, and the superheater-pipes 69 are connected similarly to the headers in both cases. The main T-head 62 and the delivery-compartment T-head $62^f$ are, however, in this instance formed in a single casting, and the communicating, receiving, and delivery ports of the header-compartments $70^f$ $70^e$ are formed in the upper portions of the rear walls of the headers instead of in the top walls thereof in order to communicate with ports in the front wall of the integral T-head casting 62, to which the headers are detachably connected by horizontal bolts 71.

The delivery-compartment T-head 62$^f$ is located below the main T-head 62, from which its walls are entirely separated, except as to the thickness of narrow connecting webs 62$^g$, by which the main and delivery compartment T-heads are united, so that the walls of both are exposed throughout substantially their entire extent to the heating action of the products of combustion in the smoke-box and no appreciable transfer of heat can take place between the two compartments. The branch steam-pipes 63 are connected to nozzles on the ends of the delivery-compartment T-head 62$^r$. The upper portion or main body of the T-head 62 is provided with ports 62$^b$ in its front wall, each of said ports communicating with a corresponding port in the rear wall of the forward compartment 70$^f$ of one of the headers, and the delivery-compartment 62$^f$ of the header is provided with ports 62$^c$ in its front wall, each of said ports communicating with a corresponding port in the rear wall of the rear compartment 70$^e$ of one of the headers. It will be seen that under this construction the front compartments of the headers receive the saturated steam from the dry pipe and the rear compartments thereof deliver the superheated steam to the branch steam-pipes and the engine-cylinders, their respective functions being thus reversed relatively to those of the compartments of the headers first described. The connection of the superheater-pipes to the header-compartments and their relation to the superheating-tubes are, however, the same in both cases, and the steam traverses in the same manner through the several members of the superheating appliance in both cases and with the same results.

It will be obvious to those skilled in the art of locomotive-engine construction that various structural modifications of my invention may be made without departure from the spirit and operative principle thereof as hereinbefore exemplified. Thus, for example, the rear compartments of the headers may be connected to the bottoms of the T-heads, as in Figs. 1 and 2, and the front compartments to the fronts of the T-heads, as in Figs. 5 and 6, the joints of each header being consequently at right angles one to the other instead of in the same plane, as in the instances above described. These joints may also be made with ground-joint rings instead of copper.

Other variations of structural detail which will be within my invention will readily occur to the constructor.

I claim as my invention and desire to secure by Letters Patent—

1. The combination, with a tubular steam-boiler, of a superheating-tube, a pair of superheater-pipes extending longitudinally therein and connected at their rear ends, a vertical casing or header comprising a receiving and a delivery compartment having substantially separated walls, the forward ends of the superheater-pipes communicating with said compartments, a steam-supply connection opening into the receiving-compartment, and a steam-delivery connection leading out of the delivery-compartment.

2. The combination, with a tubular steam-boiler, of a superheating-tube, a pair of superheater-pipes extending longitudinally therein and connected at their rear ends, a vertical casing or header comprising a receiving and a delivery compartment having substantially separated walls, the forward ends of the superheater-pipes communicating with said compartments, a main T-head communicating with the receiving-compartment of the header, and a delivery-compartment T-head communicating with the delivery compartment of the header.

3. The combination, with a tubular steam-boiler, of a superheating-tube, a pair of superheater-pipes extending longitudinally therein and connected at their rear ends, a vertical casing or header comprising a receiving and a delivery compartment having substantially separated walls, the forward ends of the superheater-pipes communicating with said compartments, a main T-head communicating with the receiving-compartment of the header, and a delivery-compartment T-head having its wall which is adjacent to the main T-head separated therefrom by an open space, and communicating with the delivery-compartment of the header.

4. The combination, with a tubular steam-boiler, of a vertical row of superheating-tubes, pairs of superheater-pipes extending longitudinally therein, fittings connecting the ends of the pipes of each pair nearer the fire-box, a main steam-supply pipe, a steam-delivery pipe, and a vertical casing or header comprising a compartment which communicates with the steam-supply pipe and with the receiving ends of the steam-channels formed by the vertical row of pairs of superheater-pipes, and a compartment having its walls substantially separated from those of the compartment first stated and communicating with the delivery ends of said channels and with the steam-delivery pipe.

5. The combination, with a tubular steam-boiler, of a vertical row of superheating-tubes, pairs of superheater-pipes extending longitudinally therein, fittings connecting the ends of the pipes of each pair nearer the fire-box, a main steam-supply pipe, a steam-delivery pipe, a vertical casing or header comprising a receiving and a delivery compartment having substantially separated walls, said compartments communicating, respectively, with the receiving and the delivery ends of the steam-channels formed by the vertical rows of pairs of superheater-pipes, a main T-head communicating with the steam-supply pipe and with one of the header-compartments, and a delivery-compartment T-head communicating with the other header-compartment and with the steam-delivery pipe.

6. A header for steam-boiler superheaters, comprising a receiving and a delivery compartment, having their inclosing walls out of contact one with the other, and abutting through metal projecting from their adjoining ends, each compartment having an end port for communication with a T-head compartment.

7. A header for steam-boiler superheaters, comprising a receiving and a delivery compartment, set one in advance of the other so as to prevent contact of their adjacent inclosing walls, and abutting through metal projecting from their adjoining ends, each compartment having an end port for communication with a T-head compartment.

8. A header for steam-boiler superheaters, comprising a receiving and a delivery compartment, having their inclosing walls out of contact one with the other, and their rear walls progressively downwardly and forwardly stepped, said compartments abutting through metal projecting from their adjoining ends.

9. A header for steam-boiler superheaters, comprising a receiving and a delivery compartment, set one in advance of the other so as to prevent contact of their adjacent inclosing walls, and having their rear walls progressively downwardly and forwardly stepped said compartments abutting through metal projecting from their adjoining ends.

10. A header for steam-boiler superheaters, comprising a receiving and a delivery compartment, set one in advance of the other so as to prevent contact of their adjacent inclosing walls and having steam supply and delivery ports at their upper ends, said compartments abutting through metal projecting from their adjoining ends.

11. In a steam-boiler superheater, the combination of a superheating-tube, a pair of superheater-pipes extending longitudinally therein and constituting a steam-channel, a T-head structure comprising a main section-compartment communicating with a steam-supply pipe, and a delivery-compartment section communicating with a steam-delivery pipe, and having its wall which is adjacent to the main T-head section separated therefrom by an open space, headers having separate saturate and superheated steam compartments and connections from the opposite ends of the superheater-pipes steam-channel to the saturate and superheated steam compartments, respectively.

12. In a steam-boiler superheater, the combination of a T-head structure comprising a main-section compartment communicating with a steam-supply pipe and a delivery-compartment section communicating with a steam-delivery pipe and having its wall which is adjacent to the main T-head section separated therefrom by an open space, headers, each divided into two compartments which communicate, respectively, with the main and the delivery compartment sections of the T-head structure, and superheater-pipes forming steam-channels, the opposite ends of which communicate with the compartments of the headers.

FRANCIS J. COLE.

Witnesses:
GRAHAM M. KER,
CHAS. McC. ANDERSON.